F. I. BURT.
CATTLE POKE.
APPLICATION FILED DEC. 7, 1916.

1,239,562.

Patented Sept. 11, 1917.

WITNESSES
James F. Crown,
Lloyd W. Patch

INVENTOR
Frank I. Burt,
BY Richard B. Owen,
ATTORNEY

UNITED STATES PATENT OFFICE.

FRANK I. BURT, OF SHALLOW WATER, KANSAS.

CATTLE-POKE.

1,239,562.  Specification of Letters Patent.  Patented Sept. 11, 1917.

Application filed December 7, 1916. Serial No. 135,652.

*To all whom it may concern:*

Be it known that I, FRANK I. BURT, a citizen of the United States, residing at Shallow Water, in the county of Scott and State of Kansas, have invented certain new and useful Improvements in Cattle-Pokes, of which the following is a specification.

This invention relates to an improvement in cattle pokes, and more particularly to devices of this character intended to be inserted through the hide of the animal in attachment, thus making the device more or less permanent in its character.

An object of my invention is to provide a poke which is bent up from a single length of wire and which may be inserted either in the brisket to prevent the animal from crawling over the fence or may be placed at the upper side of the neck to insure that the animal will be restrained from crawling through or under a fence, it being the intention that the device shall be inserted through the hide of the animal to lie within the hair substantially out of sight but with hooks formed as parts thereof projecting to catch upon the fence or other structure through or over which the animal may endeavor to pass.

A further object is to so construct the device that means may be applied in conjunction therewith to hold the main portion, in such a relation that the hooks will be disposed to at all times extend sufficiently that they will accomplish the desired purpose.

With the above and other objects in view, my invention consists in certain novel features of construction and combinations of parts which will be hereinafter set forth in connection with the drawings and then more particularly pointed out in the claims.

In the drawings:—

Figure 1:
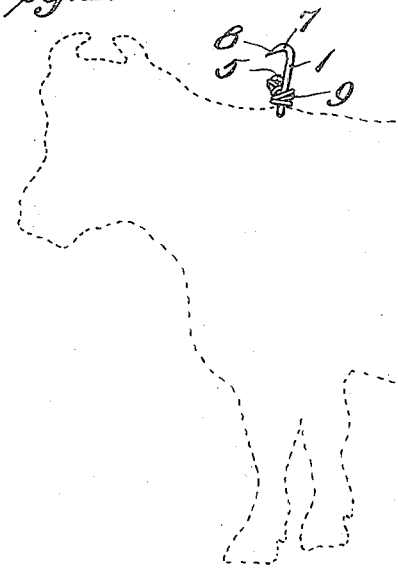
Figure 1 is a view diagrammatically indicating the animal by dotted lines and with the device of my invention shown fitted at the back of the neck.
Figure 2:
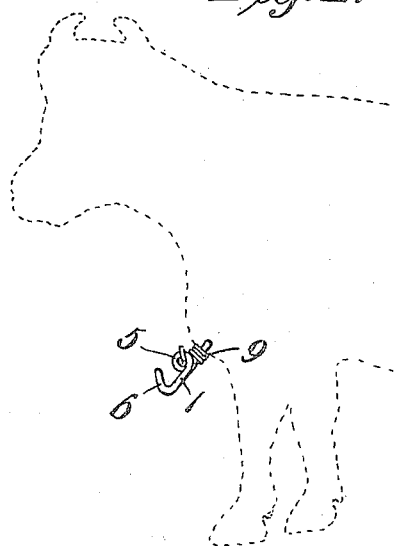
Fig. 2 is a view similar to Fig. 1 showing the structure secured at the brisket.
Figure 3:
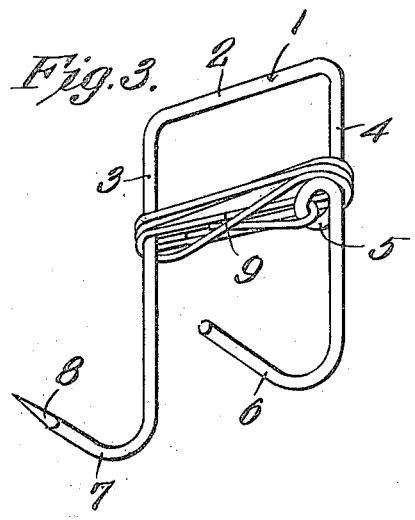
Fig. 3 is a perspective view of the device showing the securing means in the fitted position.

The main portion of the poke comprises the single length of wire which is indicated as a whole by the reference character 1, and this wire is bent and shaped to provide the cross bar 2 which has the arms 3 and 4 extending therefrom in substantially U-shaped formation. The arm 4 is looped around to form the eye 5, and is then carried out and turned or bent back to form the hook 6, and the arm 3 is bent up at its ends to form a hook 7 which corresponds substantially in its shape to the formation of the hook 6. The arm 3 at its extreme end is pointed as shown at 8.

In the use of the device, the hide of the animal will be grasped in the one hand and lifted to insure that no muscles or cords are held therebetween, and then the pointed end 8 is pressed against this loose flap of the hide which has been taken up and is penetrated through the hide, the penetration being continued until the cross bar 2 is within the opening formed through the hide. It will of course be understood that the end of the arm or member 3 might be made blunt and that a knife or other pointed implement might be employed to form the opening through the hide, but by providing the pointed end 8, the necessity of employing other means will be avoided and at the same time an opening just sufficient for the passage of the members to insert the same in the proper relation will be formed. After the member 1 has been brought to the proper relation of insertion within the neck at the back thereof or at the brisket of the animal, and with the hooked ends 6 and 7 disposed forwardly, if the animal endeavors to pass a fence or other barrier, the hooks will become caught and will pull upon the animal to restrain the same from continued efforts.

Figure 4:
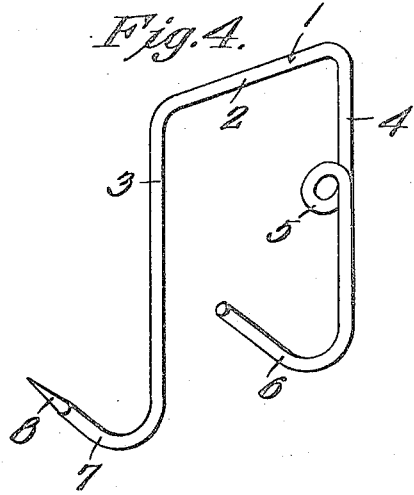
Fig. 4 is a view similar to Fig. 3 but with the securing means removed.

Under ordinary circumstances, the member as shown in Fig. 4 will doubtless be sufficient to accomplish the purpose and will doubtless hold in the proper relation without additional securement; however, it is perhaps preferable that a flexible wire or other member 9 be secured at one of its ends through the eye 5 and then wound across and back between the arms of the member 1 following the placing of this member through the hide, and thus the member 1 will not only be held against accidental or casual displacement, but at the same time the disposition of this wire or fastening member across between the arms 3 and 4 will prevent the device from being brought down entirely flat against the body of the animal or moved down to a sufficient extent that the hooks thereof would be rendered practically inoperative.

From the foregoing it will be seen that I have provided a poke which may be very inexpensively manufactured and which will act efficiently to restrain the animal upon which it is used from casually passing through or over, or under the barriers of an inclosure, and which further, cures breachy animals where it is placed in use.

While I have herein shown and described only one specific form of the device, it will be understood that other securing means than the wire as shown might be employed, and that changes and modifications might be made in the form and arrangements of the parts without departing from the spirit and scope of my invention, in view of which fact I do not wish to be limited to the exact disclosure but only to such points as may be set forth in the claims.

I claim:

1. A cattle poke comprising a single length of wire bent to take a substantially U-shaped form and having the ends formed into engaging portions with one of said ends sharpened to provide a penetrating point to permit insertion of the member through the hide of an animal to bring the looped portion of the U-shape to be retained through the hide, and one of the arms of the U-shape form being bent and looped to provide an eye for the reception of means by which the poke is secured in place and held against twisting.

2. A cattle poke comprising a single strip of metal shaped to provide a cross bar with arms extending therefrom and bent at their ends to form hooks, the hooked portion of one of said arms being sharpened to provide a penetrating point to permit penetration of the member through the hide of the animal to bring the cross bar through the hide to a relation that the hooked ends of the arms extend forwardly, the remaining arm being looped to form an eye, and a securing member passed through said eye and then around the other arm of the device to secure the same against displacement.

In testimony whereof I affix my signature in presence of two witnesses.

FRANK I. BURT.

Witnesses:
C. J. VAN ANTWERP,
H. S. RECTOR.

Copies of this patent may be obtained for five cents each, by addressing the "Commissioner of Patents, Washington, D. C."